United States Patent
Greb et al.

(10) Patent No.: US 11,460,108 B2
(45) Date of Patent: Oct. 4, 2022

(54) PARKING LOCK ACTUATOR FOR INTEGRATION IN A VEHICLE TRANSMISSION

(71) Applicant: Schaeffler Technologies AG & Co. KG, Herzogenaurach (DE)

(72) Inventors: Peter Greb, Ottersweier (DE); Laszlo Man, Ottersweier (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/296,600

(22) PCT Filed: Nov. 13, 2019

(86) PCT No.: PCT/DE2019/100975
§ 371 (c)(1),
(2) Date: May 25, 2021

(87) PCT Pub. No.: WO2020/114548
PCT Pub. Date: Jun. 11, 2020

(65) Prior Publication Data
US 2021/0396311 A1      Dec. 23, 2021

(30) Foreign Application Priority Data
Dec. 3, 2018 (DE) .................... 102018130645.8

(51) Int. Cl.
F16H 63/34 (2006.01)
(52) U.S. Cl.
CPC ..... F16H 63/3425 (2013.01); F16H 63/3441 (2013.01); F16H 63/3458 (2013.01)

(58) Field of Classification Search
CPC ............. F16H 63/3425; F16H 63/3441; F16H 63/3458; F16H 63/3466; F16H 63/3475; B60T 1/0062; B60T 1/005
See application file for complete search history.

(56) References Cited

U.S. PATENT DOCUMENTS

| | | | |
|---|---|---|---|
| 6,588,294 B1 * | 7/2003 | Rogg | F16H 63/3416 74/473.21 |
| 2019/0049005 A1 * | 2/2019 | Clark | G01D 5/20 |

FOREIGN PATENT DOCUMENTS

| | | |
|---|---|---|
| DE | 102010029401 A1 | 12/2011 |
| DE | 102014106527 A1 | 11/2014 |

(Continued)

*Primary Examiner* — Ernesto A Suarez
*Assistant Examiner* — Lori Wu

(57) ABSTRACT

A parking lock actuator includes a blocking cam, an actuating device, an energy store, a blocking drive, and an intermediate element. The blocking cam is arranged for positive engagement with a tooth gap of a parking lock gear and the actuating device is for transferring an actuating force to the blocking cam. The energy store is for transferring the actuating force from the actuating device to the blocking cam, the blocking drive is for displacing the actuating device, and the intermediate element is freely displaceable relative to the blocking drive over a predetermined intermediate path for displacing the actuating device. The blocking cam is arranged to positively engage the tooth gap to block rotational movement of the parking lock gear when the actuating device is in a blocked position, and the parking lock gear is rotatable when the actuating device is in an open position.

17 Claims, 2 Drawing Sheets

(56) References Cited

FOREIGN PATENT DOCUMENTS

| | | |
|---|---|---|
| DE | 102013222843 A1 | 5/2015 |
| DE | 102015218411 B3 | 2/2017 |
| DE | 102017102804 A1 | 8/2018 |
| DE | 102018110614 A1 | 11/2019 |
| EP | 1855033 A2 | 11/2007 |
| WO | WO-2018095478 A1 * | 5/2018 |
| WO | 2018145696 A1 | 8/2018 |

* cited by examiner

PARKING LOCK ACTUATOR FOR INTEGRATION IN A VEHICLE TRANSMISSION

CROSS-REFERENCE TO RELATED APPLICATIONS

This application is the United States National Phase of PCT Appln. No. PCT/DE2019/100975 filed Nov. 13, 2019, which claims priority to German Application No. DE102018130645.8 filed Dec. 3, 2018, the entire disclosures of which are incorporated by reference herein.

TECHNICAL FIELD

The present disclosure relates to a parking lock actuator for integration in a vehicle transmission, and more specifically to a parking lock actuator including a blocking cam for blocking a rotational movement of an assigned parking lock gear by means of positive engagement of the assigned parking lock gear in a tooth gap; an actuating device for transmitting an actuating force to the blocking cam, the actuating device being movable between a blocked position and an open position; a blocking drive for moving the actuating device; and an energy store for transferring the actuating force from the actuating device to the blocking cam. The actuating device of the blocking drive can be moved along a travel path by means of an intermediate element, the intermediate element being freely displaceable relative to the blocking drive via a predetermined intermediate path.

BACKGROUND

Parking lock devices are known from the prior art, which are intended to ensure that a parked, i.e., usually abandoned, vehicle cannot roll. For example, the parking lock device acts as a positive lock in that a blocking cam engages in a tooth gap of a parking lock gear. Such a lock to prevent the motor vehicle from rolling away can only be set, for example, at a speed below 2 km/h [two kilometers per hour] of the motor vehicle in question, whereas above 4 km/h, the lock may be automatically prevented from closing, for example, by rejecting a blocking cam. Such a block for motor vehicles having an automatic transmission or an electrified actuation drive, for example hybrid vehicles, often required by law. For example, such a parking lock device is known from the subsequently published DE 10 2017 102 804 A1

Given the large number of components in a motor vehicle, it is necessary to achieve a high degree of compactness of the components. Therefore, a blocking drive should be integrated into a vehicle transmission using already available installation space, if possible. Up until now, actuation of the blocking cam has normally been selected in which the blocking cam was pushed out of the blocked position by an actuating device and was only released from the open position into the blocked position so that the blocking cam could then automatically engage in a tooth gap. However, this has the disadvantage that, due to the installation space, large distances must be covered to reach a possible mounting position for a blocking drive. As a result, an overall increased installation space is required and the mechanical rigidity of the system, especially of the actuating device, decreases.

SUMMARY

The present disclosure relates to a parking lock actuator for integration in a vehicle transmission, having at least the following components:
a blocking cam for blocking a rotational movement of an assigned parking lock gear by means of positive engagement of the assigned parking lock gear in a tooth gap;
an actuating device for transmitting an actuating force to the blocking cam, the actuating device being movable between a blocked position and an open position, wherein, in the blocked position of the actuating device, a rotational movement of the assigned parking lock gear can be blocked by means of the blocking cam, and, in the open position of the actuating device, rotational movement of the assigned parking lock gear is enabled;
a blocking drive for moving the actuating device; and
an energy store for transmitting the actuating force from the actuating device to the blocking cam.

The actuating device of the blocking drive may be moved along a travel path by means of an intermediate element, the intermediate element being freely displaceable relative to the blocking drive via a predetermined intermediate path.

The parking lock actuator proposed here can be integrated into a vehicle transmission in a small space, for example in a transmission gearing, in a differential, in a friction clutch, or in a torque converter for transferring torque from an internal combustion engine to a vehicle wheel. The blocking drive is set up in a pulling manner to release the blocked position, i.e., the actuating device is drawn out of the blocked position into the area of the blocking drive. This is not to be understood as a restriction with regard to the force guidance. On the contrary, in one embodiment, the application of force from the blocking drive on the actuating device is in a pressing manner. In the prior art, to release the lock of the parking lock gear, the actuating device was generally extended from the area of the blocking drive and this actuation was therefore referred to as a pushing actuation, regardless of the force guidance. To move into the blocked position, the actuating device was then retracted and thus a free path was created for the blocking cam so that it could move only in the area of the free path and could automatically engage when a tooth-on-tooth position was present.

The blocking cam is designed to engage positively in a tooth gap of a parking lock gear, the blocking cam being held in a normal position by a (possibly separate) energy store and/or by gravity in an open position so that the parking lock gear can then rotate freely. A normal position is present when the actuating device is in an open position. If, on the other hand, the blocking cam is moved into the blocked position by the actuating device, the positive engagement of the blocking cam in a tooth gap prevents the parking lock gear from rotating about its gear axis, or only within the legally permissible limits. A vehicle wheel is thus fixed and the motor vehicle can no longer roll.

The actuating device is set up to transfer the blocking cam from the open position to the blocked position as a result of a positive or non-positive contact, for example by pressing, and hereinafter the corresponding position of the actuating device in which the actuating device likewise moves the blocking cam to the blocked position, is also referred to as the blocked position. The position in which the blocking cam is enabled by the actuating device and can return to the open position is accordingly also referred to as the open position of the actuating device.

It should be noted that the actuating device, when it exerts an actuating force on the blocking cam in the direction of the blocked position, wherein the actuating force must transfer the blocking cam into its blocked position, and the blocking cam is transferred into a tooth gap in positive engagement only if it is accordingly positioned with respect to a tooth gap, i.e., is positioned in a tooth-on-gap position. Otherwise the blocking cam remains in a tooth-on-tooth position and the parking lock gear is (until reaching a tooth-on-gap position) freely rotatable.

In addition, in an example embodiment, when there is excessive rotational speed of the parking lock gear due to the shape of the tooth gap and/or the blocking cam, the resulting tangential relative speed between the parking lock gear and blocking cam is so great that the blocking cam is in the blocked position of the actuating device, despite the actuating force transmitted from the actuating device to the blocking cam, the blocking cam does not transition to positive engagement. For example, the excessive speed corresponds to a motor vehicle speed of more than 4 km/h [four kilometers per hour]. In such an embodiment, when the load is according to the design, there is no damage to the parking lock gear or the blocking cam.

To drive the actuating device, a blocking drive is provided, for example an electric, pneumatic or hydraulic drive, with which the actuating device can be moved along a travel path. The travel path has a defined end on the cam side and a defined opposite end. If the blocking cam is ready for a positive engagement in a tooth gap (tooth-on-gap position), the blocked position of the actuating device and the blocking cam is present when the blocking drive has reached the end of the travel path on the cam side. However, the blocking cam is always in the open position when the actuating device is at the opposite end of the travel path and thus is transferred into the open position.

It should be noted that the path of travel of the blocking drive is a linear path or a rotating path. So as to achieve a free path for the position of the actuating device relative to the travel path of the blocking drive, the energy store is provided, which stores the actuation force resulting from the movement of the blocking drive by charging the energy store, for example designed as a compression spring. Alternatively, the energy store is designed as a pneumatic or hydraulic energy store, wherein the mechanically input energy, meaning the force or torque, is chiefly, meaning with a high efficiency level, again expended as mechanical energy, meaning as a force or torque. In other words, the actuating force of the blocking drive is not passed on to the blocking cam in the form of a mechanical force, but the actuating force is only passed on indirectly to the blocking cam via the energy store. This allows the time difference between actuation by the blocking drive and actual locking of the parking lock gear. The parking lock gear remains freely movable despite the output of an actuating force from the blocking drive to the actuating device, as long as the blocking cam is in a tooth-on-tooth position or a predetermined maximum speed of the parking lock gear is exceeded. A rotational movement of the parking lock gear is only blocked with a positive fit when the blocking cam is (for a long enough time) in a tooth-on-gap position.

A blocking drive set up for torque output can be rotated, for example, about a drive axis, and the travel path from the cam-side end to the opposite end is mechanically ensured and/or electronically regulated and is composed of a predefined number of revolutions. The actuating device is then, for example, a spindle or a spindle nut. If the actuating device is a spindle, the spindle is torque-supported and can be moved axially. If the actuating device is a spindle nut, the spindle nut is torque-supported and can be moved axially by a rotating spindle.

It should be pointed out that the actuating device moved linearly acts on the blocking cam or acts on the blocking cam in a pivoting movement. In the case of a pivoting movement, the actuating device is thus set up to rotate, and a torque-increasing transmission gear may be interposed between the blocking drive and the rotating actuating device.

Here, an intermediate element is now additionally provided between the blocking drive and the actuating device, which is freely displaceable on an intermediate path. The intermediate path has a predefined first end and a predefined second end. The intermediate element is designed to allow decoupling by the energy store, that is to say to create a free path when the blocking cam is in a tooth-on-tooth position. This means that the length of the intermediate path is tailored to the energy store. In one embodiment, the intermediate path corresponds to the distance between the blocked position and the open position of the actuating device, i.e., the length of the travel path or the distance between the end on the cam side and the opposite end. In one embodiment, the intermediate path is longer, a first stop for the intermediate element being positioned in such a way that the actuating device can be guided out of the blocked position, and a second stop is positioned such that a loss protection device is formed between the actuating device and the intermediate element.

The first stop is a mechanical stop. The second stop is regulated purely electronically, for example, and/or a mechanical safety stop is provided, the safety stop not necessarily being positioned congruently with the second stop. If the blocking drive delivers a torque and a torque-supported and axially movable spindle is provided as the actuating device, the intermediate element is designed as a rotating drive spindle nut. However, in contrast to a conventional drive spindle nut, the intermediate element is not axially supported in every position, but is axially displaceable along the intermediate path. This drive spindle nut only forms an axially supported counter-bearing for the propulsion of the spindle when the resulting actuating force from torque and thread pitch are directed opposite one another. So the intermediate element (depending on the direction of force) only forms a counter-bearing for the actuating force of the blocking drive when it reaches the first end so that the actuating device is then transferred from the blocked position to the open position, i.e., is retracted.

In an alternative embodiment, the actuating device is (conversely) formed by a torque-supported and axially movable spindle nut and the intermediate element is formed by a rotating drive spindle, wherein, in accordance with the preceding description, this drive spindle, in contrast to a conventional drive spindle, is not axially supported in every position, but can be axially displaced along the intermediate path.

As long as one tooth-on-tooth position of the blocking cam against the assigned parking lock gear is present, the intermediate element moves in a direction opposite to the direction of movement of the actuating device until the intermediate element has reached a second end of the intermediate path. The energy store counteracts this countermovement of the intermediate element. However, the energy store is blocked because the blocking cam is in the tooth-on-tooth position is held open and thus prevents movement of the actuating device into the blocked position. The energy store therefore remains tensioned (almost) as in the open position in a storage position, that is to say charged, for example designed as a compression spring or spiral spring.

However, the energy store is now not tensioned in the interaction of the intermediate element and the actuating device, which is supported via the intermediate path at the first end when the intermediate element has reached the second end of the intermediate path according to the open position, but is free there. Only the blocking cam held open in the tooth-on-tooth-position prevents the energy storage device from being discharged. For discharging the energy store, a corresponding free path is created on the drive side as a result of the position of the intermediate element at the second end of the intermediate path at a distance from the first end of the intermediate path.

If the tooth-on-tooth position is canceled by the parking lock gear rotating and the blocking cam, preloaded by means of the energy store, being allowed to engage in a tooth gap, the charged energy store pushes the intermediate element from the second end of the intermediate path to the first end of the intermediate path; that is because the blocking cam now releases the movement of the actuating device.

As soon as a tooth gap of the parking lock gear is positioned relative to the blocking cam, the blocking cam engages in the tooth gap as a result of the bias. In the biased state, a rotational movement of the parking lock gear is not yet prevented, preferably with a low level of friction between the blocking cam and the parking lock gear due to a low pre-tensioning force.

According to an example embodiment of the parking lock actuator, the actuating device has a locking head, by means of which the blocking cam is held in positive engagement in a tooth gap of the assigned parking lock gear.

According to this embodiment, the actuating device has a locking head, by means of which the blocked position can be secured. In no load case, the locking head can be moved out of its blocked position by the blocking cam itself in such a way that the blocking cam could be moved out of engagement with a tooth gap of the assigned parking lock gear. The locking head can only be moved out of this blocked position again by actively moving the actuating device by means of the blocking drive towards the open position so that the blocking cam can be moved out of the tooth gap as a result of an opening force.

In an example embodiment, in the blocked position, the locking head is supported radially against a support stop relative to the gear axis of the parking lock gear.

The load on the locking head is kept low in that it is supported radially against a support stop. The locking head thus fills a gap between the blocking cam and the support stop so that when the actuating device is shaped like a beam (for example as a spindle drive), a bending load on the actuating device is prevented. The support stop may be provided over the entire length between the open position and the blocked position of the actuating device so that the actuating device can be moved in a purely linear manner over the entire travel path free of bending load, e.g., axially parallel to the actuating direction of the blocking drive. Such a support stop is formed by a separate element or directly from the housing of a vehicle transmission if the parking lock actuator is integrated into a vehicle transmission. The actuating device may be guided over the entire travel path or over part of the travel path, but at least at the end on the cam side, parallel to the actuation axis of the blocking drive and supported against a bending load. The actuation device may also be guided along this actuation axis of the blocking drive in parallel or coaxially and therefore without joints.

According to an example embodiment of the parking lock actuator, the blocking cam is arranged on a pivot lever that can be tilted about a bearing axis.

In this embodiment, the blocking cam is arranged on a pivot lever with a bearing axis so that the blocking cam is pivoted out of the radial extent of the parking lock gear in the open position and is pivoted into a tooth gap in the blocked position. In such a configuration, the assembly including the pivot lever and blocking cam is referred to as a locking pawl, for example. In an alternative embodiment, the blocking cam is designed, for example, as a linearly movable pin, which is aligned with the pin axis radially to the parking lock gear to the gear axis of the parking lock gear and is movable along this pin axis.

According to an example embodiment of the parking lock actuator, the energy store exerts an axial force along the actuating device, with the axial force for transferring to the blocked position acting on the cam side against a driver stop of the actuating device and on the other side the axial force for transferring to the open position against an opening lever of the pivot lever. After attainment of the first end of the intermediate path, the leverage of the actuating device on the blocking cam is greater than the leverage on the opening lever.

Here the energy store is set up to exert an axial force, for example as a helical compression spring or a gas compression spring. The energy store can be charged between two movable elements, for example can be loaded as a compression spring, on the one hand, against an opening lever of the pivot lever of the blocking cam and, on the other hand, against a driver stop of the actuating device. In an open position of the actuating device, the driver stop forms the axial bearing for the energy storage device and the resulting (second) axial force on the opening lever of the pivot lever moves the blocking cam out of the engagement position or holds the blocking cam in the open position so that the parking lock gear can then be freely rotated about its gear axis.

The driver stop is prevented from moving from the open position to the blocked position by means of the blocking drive in interaction with the intermediate element supported at the first end of the intermediate path, i.e., resting against a mechanical stop. This application of force to the actuation device is referred to here as a pulled actuation. In this case, the energy store is charged and the intermediate element is held by the blocking drive against the first end of the intermediate path.

As soon as the intermediate element has reached the second end of the intermediate path, the actuating device acts on the pivot lever. Now the axial force applied by the energy store on the driver stop results in a (closing) torque about the bearing axis, and the closing torque is greater than the opposing (opening) torque resulting from the (antagonistic) axial force applied by the energy storage device to the opening lever. This is achieved in that the lever around the bearing axis of the pivot lever of the opening lever is shorter than the lever with which the actuating device acts on the pivot lever. Leverage here means the product of the force and the lever travel.

To release the blockage of the parking lock gear, the opening moment on the pivot lever resulting from the second axial force must be greater than the closing moment on the pivot lever resulting from the first axial force, and vice versa. For opening, the park lock actuator may include a lock that must be released, or, for closing, a tooth-on-gap position must be present.

For this purpose, the pivot lever may have a locking link against which the actuating device acts, e.g., by means of a locking head. The locking link may be arranged with the same or similar lever spacing as the blocking cam to the bearing axis of the pivot lever.

In a tooth-on-tooth position, the actuating device is pushed against the pivot lever and the energy store is supported against the opening lever so that the intermediate element is displaced to the second end of the intermediate path as a result of provision of a drive path of the blocking drive for closing the parking lock device. As a result of the moments on the pivot lever, the energy store tries to push the intermediate element towards the first end of the intermediate path and transfers, for example presses, the actuating device against the (blocked) pivot lever. If a tooth-on-gap position is achieved (e.g., sufficiently slowly), this resulting closing torque about the bearing axis of the pivot lever is not opposed by a larger countertorque, i.e., opening torque, because the opening lever is shorter, and the blocking cam is transferred to the relevant tooth gap due to the torque ratio about the bearing axis of the pivot lever. The intermediate element is then shifted towards the first end of the intermediate path.

According to a further aspect, a parking lock device for preventing a stationary motor vehicle from rolling is proposed, having at least the following components:
a parking lock gear for a drive train of a motor vehicle, e.g., on the transmission output side in a vehicle transmission; and
a parking lock actuator according to an embodiment according to the above description. The parking lock gear is prevented from rotating when the blocking cam engages.

The parking lock device proposed here includes a parking lock actuator and a parking lock gear. The parking lock gear is integrated into the drive train of a motor vehicle, e.g., in a vehicle transmission, and can be switched between an open position and a blocked position according to the preceding description so that the parking lock gear is prevented from rotating in the blocked position.

In an example embodiment, the parking lock actuator and the parking lock gear form a structural unit. Such a structural unit can be delivered for installation as an integral component and can be mounted at the intended assembly location, for example in a motor vehicle, without the need to dismantle said structural unit again.

When installed in a motor vehicle, the parking lock gear is arranged in such a way that at least one of the vehicle wheels can no longer be moved when the blocking cam is in the blocked position, that is, the parking lock gear can no longer be rotated. In this regard, the connection stiffness and backlash between the parking lock gear and the blocking cam, and towards the vehicle wheel in question, are not taken into account so that the vehicle wheel may still be movable within a small angle of rotation. However, the legal framework conditions can be observed for this mobility of the motor vehicle.

In an example embodiment, the parking lock gear is designed to rotate permanently with the drive train, and, in another embodiment, the parking lock gear, at least in the blocked position, is secured (indirectly) to the at least one vehicle wheel and transfers torque.

In one embodiment of the clutch actuator, the parking lock gear is arranged in the torque flow on the transmission output side in a vehicle transmission.

According to a further aspect, a vehicle transmission is proposed for a drive train of a motor vehicle having at least the following components:
a torque input for receiving torque from a drive engine;
a torque output for outputting a received torque to at least one vehicle wheel; and
a parking lock device according to an embodiment according to the above description for locking the parking lock gear. The parking lock gear forms a gear of the vehicle transmission, and the parking lock actuator may be integrated into a transmission space of the vehicle transmission formed by a housing.

The vehicle transmission, for example an automatic transmission, includes the parking lock gear and the parking lock actuator may be integrated into the vehicle transmission, for example accommodated and supported in the transmission space of the housing. For example, the parking lock gear forms a permanent or shift-dependent driven gear, for example a spur gear, of a shiftable transmission gear, and the at least one tooth gap for the engagement of the blocking cam (see description below) may be formed as a separate recess, i.e., is not part of a spur gear toothing that transmits the engine torque.

The vehicle transmission has a torque input, for example one or more transmission input shafts, and a torque output, for example one or more transmission output shafts. In the vehicle transmission, the torque is diverted, reduced, converted and/or distributed per specification (as a differential). In one embodiment, the vehicle transmission is a clutch, for example a friction clutch or dog clutch in the torque flow. The torque input is arranged on the drive engine side and the torque output is arranged on the drive gear side. The direction of torque may, however, also be the opposite, e.g., in the parking position, from a vehicle wheel to a drive engine or a generator.

According to a further aspect, a motor vehicle is proposed which has at least one vehicle wheel and a drive train having at least one vehicle transmission according to an embodiment per the above description and with at least one drive engine. The at least one drive engine of the drive train transfers a torque by means of the at least one vehicle transmission to the at least one vehicle wheel, and the parking lock gear of the parking lock device is switched into the torque flow at least in a parking circuit in such a way that the at least one vehicle wheel is rotationally fixed with the parking lock gear so that the vehicle wheel in question can only be rotated when the actuating device is in is in the open position.

The motor vehicle is, for example, a passenger car, a truck or a motorized two-wheeler. The motor vehicle has a drive train which includes at least one drive unit, for example an internal combustion engine and/or an electric drive engine. The torque that can be output by the drive unit is output to at least one vehicle wheel, the drive gear, via a vehicle transmission. The vehicle transmission referred to here may be a shiftable transmission gear. Alternatively, the vehicle transmission is, for example, a fixed transmission, i.e., with an unchangeable transmission, or a differential or a slip clutch.

The parking lock device proposed here may be designed as described above and integrated into the vehicle transmission. In an example embodiment, the parking lock and (additional) parking brake act on a single (common) vehicle wheel, and both the parking lock and the parking brake of the (common) blocking drive may be actuated. Alternatively, the parking lock device is designed such that the parking lock acts on a first vehicle wheel and the parking brake on a second vehicle wheel that is different from the first. In a further alternative, a conventional, separately arranged and separately actuatable parking brake is provided.

A rotational movement of the at least one vehicle wheel is only possible in a parking circuit when the parking lock (and the parking brake) are released. Otherwise, reference is made to the preceding description.

BRIEF DESCRIPTION OF THE DRAWINGS

The above disclosure is explained in detail below based on the relevant technical background with reference to the associated drawings, which show example embodiments. The disclosure is in no way restricted by the purely schematic drawings, while it should be noted that the drawings are not dimensionally accurate and are not suitable for defining proportions. In the figures.

DETAILED DESCRIPTION

Figure 1:
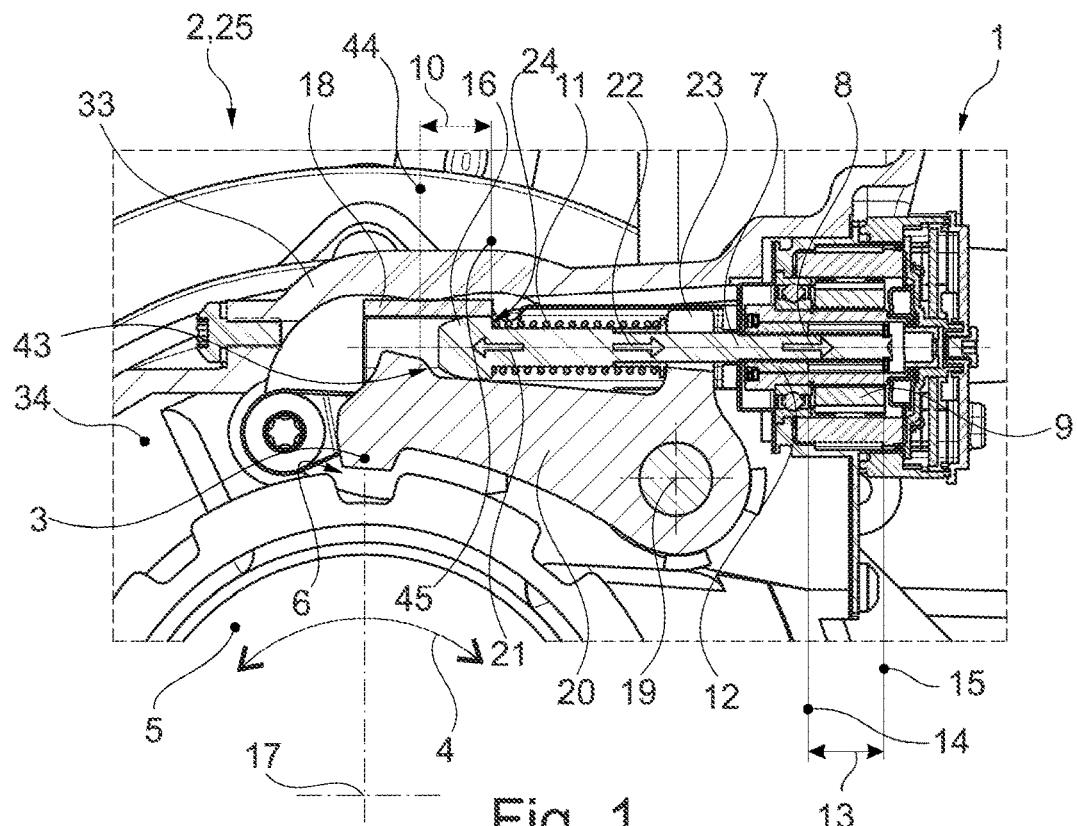
FIG. 1 shows a schematic sectional view of a parking lock device in an opened position.

FIG. 1 schematically shows a parking lock device 25 in section in a partially shown vehicle transmission 2 with a parking lock actuator 1 integrated in its transmission space 34 within the housing 33. A parking lock gear 5 with a gear axis 17 is provided here so that the parking lock gear 5 can be moved along the rotational movement 4. Thus, in this case a plurality of tooth gaps 6 can be positioned relative to a blocking cam 3 in such a way that one tooth-on-gap position or a tooth-on-tooth position (see FIG. 2) is present.

The blocking cam 3 is arranged on a pivot lever 20 which can be pivoted about a bearing axis 19. In the shown state of the parking lock actuator 1, the blocking drive 9, in this case electrical, delivers a torque or maintains it by means of self-locking so that an opening actuating force 8 (pointing to the right in the diagram) is applied to the actuating device 7, which is designed as an axially movable spindle. As a result, the intermediate element 12, which is designed here as a rotating spindle nut that is axially displaceable to a limited extent, is supported on the first end 14 of the intermediate path 13. The actuating device 7 is fully retracted on the drive side into axial overlap with the blocking drive, i.e., pulled in, and is thus guided towards the opposite end 45 of the travel path 10.

As a result of the open position of the actuating device 7, here in FIG. 1, the energy store 11 is loaded, here designed as a helical compression spring, because the energy store 11 is clamped between a driver stop 24 on the cam-side end section, here designed as a locking head 16, of the actuating device 7 and the opening lever 23 of the pivot lever 20. The energy store 11 is designed here as a helical compression spring, but could also be designed as a helical tension spring or an elastomer or the like. The energy store 11 thus acts with the first axial force 21 only against the driver stop 24. However, this is held by means of the actuating force 8 of the blocking drive 9 transferred by the intermediate element 12 displaced towards the first end 14.

The (antagonistic) second axial force 22 of the energy store 11 acts on the opening lever 23 so that the pivot lever 20 is moved into the open position. The locking head 16 is supported here (based on the gear axis 17 of the parking lock gear 5) radially on an axially parallel support stop 18, which over the entire length between the blocked position and the open position of the actuating device 7 forms a parallel-tangential support rail for the actuating device 7. This component forming the support stop 18 is also supported here on a wall element of the housing 33. In this open position, the locking head 16 is kept separate from any action on the locking link 43 at the rear of the blocking cam 3, in no-force or low-force contact, so that the second axial force 22 in interaction with the opening lever 23 has greater leverage on the pivot lever 20. The open position of the blocking cam 3 is thus safely maintained.

Figure 2:
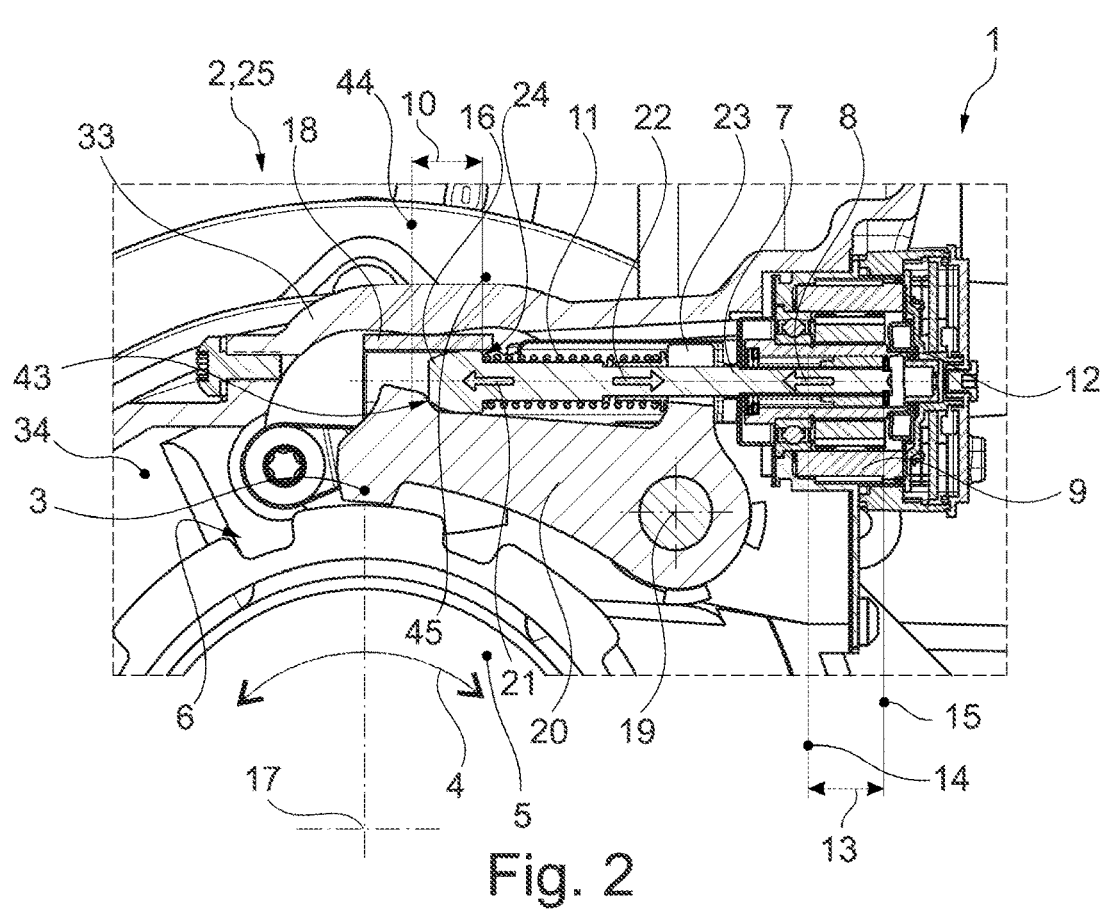
FIG. 2 shows a schematic sectional view of a parking lock device in tooth-on-tooth position.

For the sake of clarity, FIG. 2 shows the same configuration of a parking lock device 25 in a vehicle transmission 2, wherein the blocked position is envisaged here and an actuating force 8 facing in the direction of the blocked position is applied to the actuating device 7 by means of the parking lock actuator 9. As a result of this actuating force 8, the intermediate element 12 is displaced to the second end 15 of the intermediate path 13 so that the energy store 11 continues to be compressed. The second end 15 is based here for example on electronic force-control via a predefined charging of the energy store 11. Alternatively, the second end 15 is electronically path-controlled or based on a mechanical stop. Here, however, the cam-side end section of the actuating device 7, i.e., here the locking head 16, is already guided against the locking link 43, and the leverage of the first axial force 21 on the pivot lever 20 is greater than the leverage of the second axial force 22 on the opening lever 23 so that the blocking cam 3 (with respect to the gear axis 17 of the parking lock gear 5) is pressed radially towards the parking lock gear 5.

Here, the parking lock gear 5 with the blocking cam 3 is in a tooth-on-tooth position so that movement of the blocking cam 3 or the pivot lever 20 is blocked and thus the energy store 11 cannot relax. It should be noted that the locking link 43 is only the part of the shown radial-actuating device-side cam of the pivot lever 20, which has a pitch such that, in interaction with the end section of the actuating device 7 on the cam side, i.e., here the locking head 16, the blocking cam 3 is transferred into a tooth gap 6 of the parking lock gear 5. Here this is a first steeper flank on the axial actuating device side. The subsequent (optional) flank is set up in the present example for an (optional) locking of the blocking cam 3 in the blocked position, as described below and shown in FIG. 3.

Figure 3:
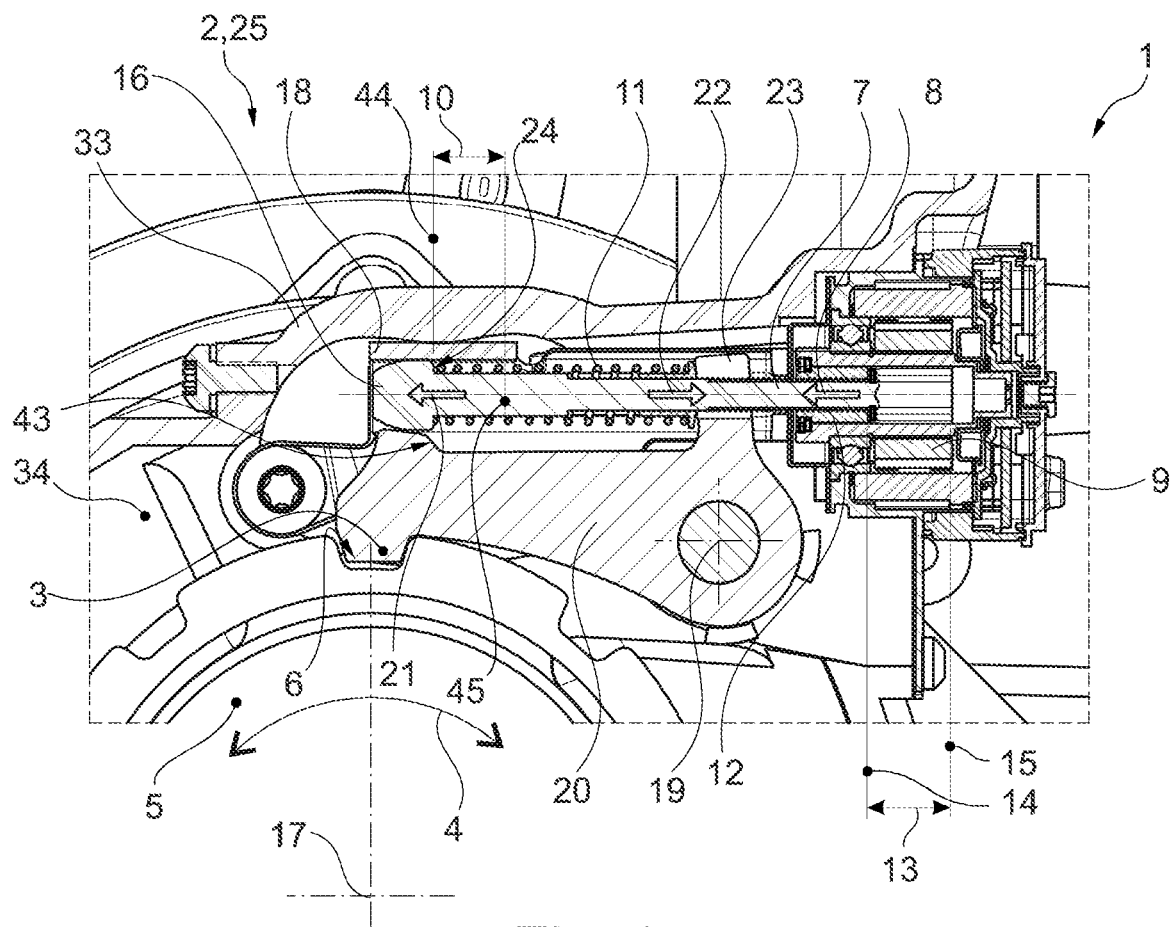
FIG. 3 shows a schematic sectional view of a parking lock device in a blocked position.

In FIG. 3, for the sake of clarity, the parking lock device 25 in the vehicle transmission 2 is shown as in the previous figures, with the blocking cam 3 in the blocked position in engagement with a tooth gap 6 of the parking lock gear 5. Starting from FIG. 2, the parking lock gear 5 has been rotated in such a way that the tooth gap 6 shown is in a tooth-on-gap position relative to the blocking cam 3. Now the first axial force 21 or the (closing) torque about the bearing axis 19 on the pivot lever 20, resulting from interaction with the locking link 43, is sufficiently large to overcome the (opening) torque, resulting from the second axial force 22, and to push the blocking cam 3 into the tooth gap 6.

Here, the actuating device 7 executes an overtravel (contained in the travel path 10) so that the locking head 16 is transferred to a blocked position by being radially supported on the support stop 18 (in relation to the gear axis 17 of the parking lock gear 5) and thus preventing a return movement of the blocking cam 3 to the open position, which could be triggered, for example, by a vibration, especially since the lowest possible closing torque may be generated by the energy store 11 in order to prevent damage to the blocking cam 3 and/or parking lock gear 5.

In the blocked position shown here in FIG. 3, the intermediate element 12 is pulled by the actuating device 11, which is pushed towards the end 44 on the cam side as a result of the discharge of the energy store 11, to the first end 14 of the intermediate path 13 from the energy store 11. Only when the blocking drive 9 applies a reverse actuating force 8 (see FIG. 1) by means of the intermediate element 12 is the locking head 16 moved out of this position again. In addition, the opening torque resulting from the second axial force 22 in the leverage on the bearing axis 19 of the pivot lever 20 again increases or, after overcoming the force-transferring contact between the actuating device 7 and the locking link 43, becomes the only force acting on the pivot lever 20 so that the blocking cam 3 is lifted out of the tooth gap 6 again by the second axial force 22 or the resulting torque about the bearing axis 19, as can be seen in FIG. 1. During this opening movement from the blocked position shown in FIG. 3, the intermediate element 12 remains in the position shown at the first end 14 of the intermediate path 13 because it forms the thrust bearing for the opposite orientation of the actuating force 8 of the blocking drive 9 as shown in FIG. 1.

Figure 4:
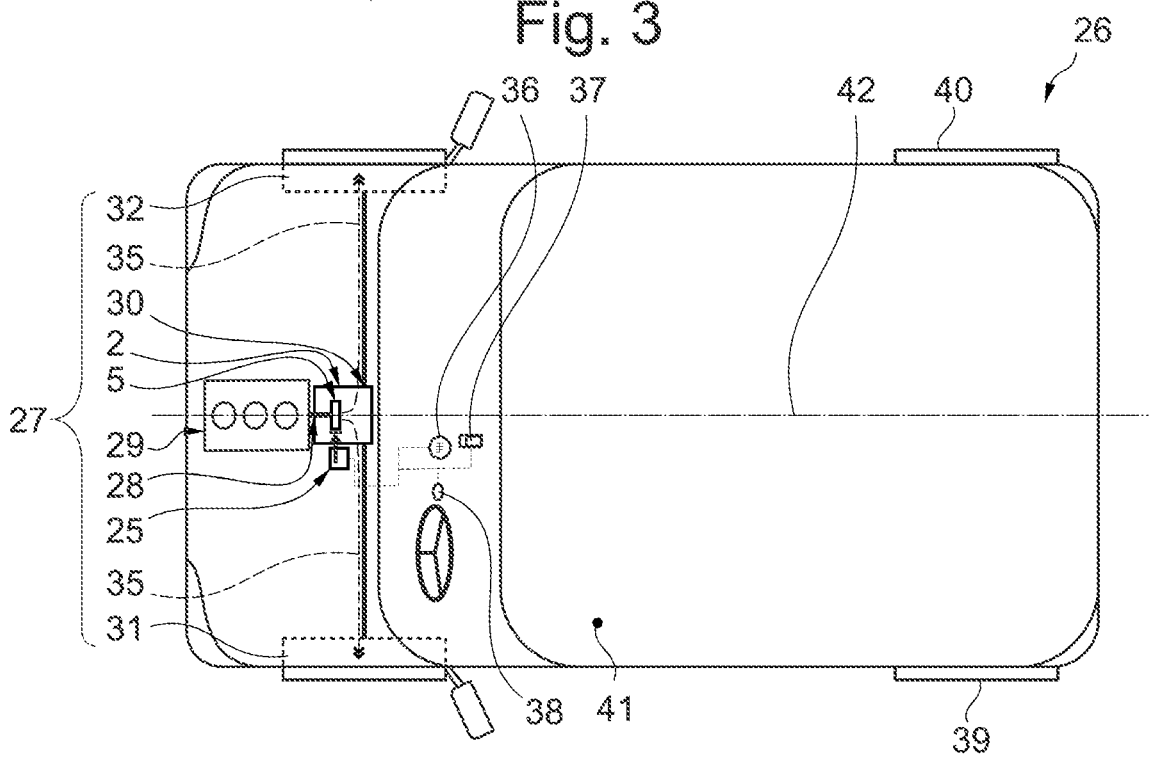
FIG. 4 shows a motor vehicle with a parking lock device integrated into the vehicle transmission in a schematic view.

FIG. 4 shows, purely schematically, a motor vehicle 26 in which the left front vehicle wheel 31 and the right front vehicle wheel 32 are blocked by means of the parking lock device 25, for example as shown in one of FIGS. 1 to 3. For this purpose, a parking lock gear 5 is arranged in a vehicle transmission 2 in the torque flow 35 in such a way that the vehicle 26 can be prevented from rolling. The drive engine 29 up to the front vehicle wheels 31 and 32 forms a drive train 27 for the motor vehicle 26, wherein the drive engine 29, is connected to the vehicle transmission 2 via a torque input 28 and, in turn, the vehicle transmission 2 is connected to the left front vehicle wheel 31 and the right front vehicle wheel 32 via the torque output 30 so as to transfer torque. The parking lock device 25 can be actuated here with at least one of the following operating elements:

from the gear shift 36, for example by means of a park shift position "P", a parking lever 37; and an ignition button 38, which can also be operated, for example, with a conventional ignition key.

The drive engine 29 is shown here as a 3-cylinder internal combustion engine. The vehicle transmission 2 is, for example, a switchable transmission gear which can be switched by means of the gear shift 36 and/or automatically for different transmission of the torque. In the direction of the longitudinal axis 42 behind the driver's cab 41 of the motor vehicle 26, a left rear vehicle wheel 39 and a right rear vehicle wheel 40 are also provided, which in an alternative embodiment are switched into the torque flow 35, for example via a cardan shaft, so that the parking lock gear 5 is arranged only for the rear vehicle wheels 39 and 40 or for all vehicle wheels 31, 32, 39 and 40 in the blocked position in the torque flow 35 so that the motor vehicle 26 is prevented from rolling. Alternatively, the shown drive train 27 is arranged at the rear of the motor vehicle 26 and is set up to drive the two rear vehicle wheels 39.

The parking lock actuator proposed here allows a compact design, so that the parking lock actuator can be integrated into a vehicle transmission little space requirement.

REFERENCE NUMERALS

1 Parking lock actuator
2 Vehicle transmission
3 Blocking cam
4 Rotational motion
5 Parking lock gear
6 Tooth gap
7 Actuation device
8 Actuation force
9 Locking drive
10 Travel path
11 Energy store
12 Intermediate element
13 Intermediate path
14 First end
15 Second end
16 Locking head
17 Gear axis
18 Support stop
19 Bearing axis
20 Swivel lever
21 First axial force
22 Second axial force
23 Opening lever
24 Driver stop
25 Parking lock device
26 Motor vehicle
27 Drive train
28 Torque input
29 Drive engine
30 Torque output
31 Left front vehicle wheel
32 Right front vehicle wheel
33 Housing
34 Gear compartment
35 Torque flow
36 Gear shift
37 Parking lever
38 Ignition button
39 Left rear vehicle wheel
40 Right rear vehicle wheel
41 Driver's cab
42 Longitudinal axis
43 Blocking link
44 Cam-side end
45 Opposite end

The invention claimed is:

1. A parking lock actuator for integration in a vehicle transmission, comprising:
a blocking cam arranged for positive engagement with a tooth gap of a parking lock gear;
an actuating device, movable between a blocked position and an open position, configured for transferring an actuating force to the blocking cam;
a pivot lever with a bearing axis, wherein the blocking cam is arranged on the pivot lever and tiltable about the bearing axis;
an energy store configured for: i) transferring the actuating force from the actuating device to the blocking cam, and ii) exerting an axial force along the actuating device, the axial force comprising:
a cam side axial force acting against a driver stop of the actuating device to transfer the actuating device into the blocked position; and
an opposite axial force acting against an opening lever of the pivot lever to transfer the actuating device into the open position;
a blocking drive for displacing the actuating device; and
an intermediate element, freely displaceable relative to the blocking drive over a predetermined intermediate path, for displacing the actuating device;

wherein,
the blocking cam is arranged to positively engage the tooth gap to block rotational movement of the parking lock gear when the actuating device is in the blocked position;
the parking lock gear is rotatable when the actuating device is in the open position; and
a first leverage of the actuating device acting on the blocking cam is greater than a second leverage of the actuating device acting on the opening lever when the intermediate element reaches a first end of the predetermined intermediate path.

2. The parking lock actuator of claim 1, wherein the actuating device comprises a locking head for holding the blocking cam in a positive engagement in the tooth gap.

3. The parking lock actuator of claim 2, wherein, when the actuating device is in the blocked position, the locking head is radially supported against a support stop.

4. A parking lock device for preventing a stationary motor vehicle from rolling, comprising:
the parking lock actuator of claim 1; and
the parking lock gear comprising the tooth gap, wherein rotational movement of the parking lock gear is prevented when the blocking cam is engaged with the tooth gap.

5. The parking lock device of claim 4, wherein the parking lock gear is arranged on a transmission output side of the vehicle transmission.

6. A vehicle transmission for a drive train of a motor vehicle, comprising:
a torque input for receiving a torque from a drive engine;
a torque output for outputting a received torque to a vehicle wheel; and
the parking lock device of claim 4, wherein:
the parking lock gear forms a gear of the vehicle transmission.

7. The vehicle transmission of claim 6 wherein:
the vehicle transmission comprises a housing; and
the parking lock actuator is integrated in a gear space formed by the housing.

8. A motor vehicle, comprising:
a vehicle wheel;
a drive train comprising the vehicle transmission of claim 6; and
a drive engine, wherein:
a torque can be transferred from the drive engine to the vehicle wheel, and
the parking lock gear is switched into a torque flow in a parking circuit such that the vehicle wheel is rotationally fixed to the parking lock gear; and
the vehicle wheel can only be rotated when the actuating device is in the open position.

9. A parking lock actuator for integration in a vehicle transmission, comprising:
a pivot lever having:
a bearing axis;
an opening lever; and
a blocking cam configured to positively engage with a tooth gap of a parking lock gear, the blocking cam configured to tilt about the bearing axis;
an actuating device, movable between a blocked position and an open position, configured for transferring an actuating force to the blocking cam;
an energy store configured for transferring the actuating force from the actuating device to the blocking cam;
a blocking drive for displacing the actuating device; and
an intermediate element, freely displaceable relative to the blocking drive over a predetermined intermediate path, configured for displacing the actuating device;
wherein,
the blocking cam is arranged to positively engage the tooth gap to block rotational movement of the parking lock gear when the actuating device is in the blocked position;
the parking lock gear is rotatable when the actuating device is in the open position; and
a first leverage of the actuating device acting on the blocking cam is greater than a second leverage of the actuating device acting on the opening lever when the intermediate element is at a first end of the predetermined intermediate path.

10. The parking lock actuator of claim 9, wherein the energy store is a compression spring.

11. The parking lock actuator of claim 10, wherein the compression spring is arranged between a driver stop of the actuating device and the opening lever of the pivot lever.

12. The parking lock actuator of claim 11, further comprising a support stop configured as a parallel-tangential support rail for the actuating device.

13. A parking lock actuator for integration in a vehicle transmission, comprising:
a pivot lever configured to tilt about a bearing axis, the pivot lever having:
an opening lever; and
a blocking cam configured to positively engage with a tooth gap of a parking lock gear; and
a locking link; and
an actuating device, movable between a blocked position and an open position, configured for transferring an actuating force to the blocking cam;
an energy store for transferring the actuating force from the actuating device to the blocking cam;
a blocking drive for displacing the actuating device; and
an intermediate element, freely displaceable relative to the blocking drive over a predetermined intermediate path, configured for displacing the actuating device;
wherein,
the blocking cam is arranged to positively engage the tooth gap to block rotational movement of the parking lock gear when the actuating device is in the blocked position;
the parking lock gear is rotatable when the actuating device is in the open position; and
the pivot lever is configured to receive: i) a closing torque via the actuating device acting on the locking link, and ii) an opening torque via the energy store acting on the opening lever.

14. The parking lock actuator of claim 13, wherein the energy store is a compression spring.

15. The parking lock actuator of claim 14, wherein the locking link and the opening lever are arranged at opposite ends of the pivot lever.

16. The parking lock actuator of claim 13, wherein the actuating device is configured with a locking head and the locking head forms a driver stop configured to receive a first axial force from the energy store.

17. The parking lock actuator of claim 16, wherein the opening lever is configured to receive a second axial force from the energy store, and the first and second axial forces act in opposite directions.

* * * * *